UNITED STATES PATENT OFFICE.

RALPH W. DARNER, OF CLEVELAND, OHIO, ASSIGNOR TO THE OHIO VARNISH COMPANY, OF CLEVELAND, OHIO, A CORPORATION OF OHIO.

COMPOSITION FOR PREVENTING ACCUMULATION OF MOISTURE ON GLASS OR OTHER SMOOTH SURFACE.

1,228,885.   Specification of Letters Patent.   Patented June 5, 1917.

No Drawing.   Application filed December 7, 1916. Serial No. 135,559.

*To all whom it may concern:*

Be it known that I, RALPH W. DARNER, a citizen of the United States, residing at Cleveland, in the county of Cuyahoga and State of Ohio, have invented a certain new and useful Improvement in Compositions for Preventing Accumulation of Moisture on Glass or other Smooth Surface, of which the following is a full, clear, and exact description.

This invention relates to a composition of matter adapted to be applied in a thin film to glass or other polished surfaces, and prevent the accumulation of condensed moisture thereon. Such a composition is of particular use on automobile wind shields, car windows, show windows, head lights, search lights, etc., in preventing rain interfering with the transparency of the glass.

One of the objects of the invention is to provide a composition for the purpose stated which shall be cheap and effective, and easily applied, and which will not deteriorate. Another object is to produce a composition which may readily be absorbed in the meshes of a fabric and carried thereby, and which will not stiffen or dry out or harden with age or on exposure to the air, but will leave the fabric soft and pliable, so that it may be readily used as the means of applying the composition to the glass. Another object is to provide a composition having this moisture-repelling characteristic and which shall also be an effective polisher for glass.

I accomplish all the above objects by the composition hereinafter described, which may be readily absorbed by a cloth, and remain therein indefinitely, and be used repeatedly on glass or other polished surfaces.

The preferred ingredients, and their proportions in my composition are as follows:

| | |
|---|---|
| Aluminium stearate | 5 parts; |
| Naphtha | 8 parts; |
| Rosin oil | 10 parts; |
| Paraffin oil | 4 parts; |
| Rotten stone | 20 parts. |

In compounding the mixture the aluminium stearate is first dissolved in the naphtha and the rosin oil and paraffin oil are added, and then the rotten stone. This mixture is then either brushed on a fabric, preferably cotton cloth, or the cloth is dipped into the mixture.

In the above described composition, the rosin oil and the paraffin oil act as condensation preventers, and the rotten stone makes an attrition agent which serves to clean and polish the glass surface. The aluminium stearate acts as a binder for the rotten stone and as a softener for the condensation preventers, particularly the rosin oil which naturally tends to harden. The aluminium stearate is also itself to some extent a condensation preventer. The naphtha is a solvent for the mixture which readily evaporates after the composition has been applied to cloth.

It is to be understood that variation may be made from the proportions given, but I have produced the best results within a variation of ten percent. either way from the amounts stated.

It has been found in practice that a cloth treated with the above composition remains soft and pliable, does not harden either when exposed to the air or in use. The aluminium stearate insures this softness and also acts as a binder for the rotten stone. When a cloth saturated with this mixture is rubbed over a wet pane of glass it deposits a thin transparent film, which prevents the condensation of moisture or fogging on the glass, but does not retard vision or reflection. This treatment also serves to clean and polish the glass and give it a brilliant appearance. The film which is deposited on the glass will remain effective for many days and may be conveniently renewed whenever required by simply rubbing the cloth over the pane.

Having thus described my invention, what I claim is:

1. A composition of matter for preventing accumulation of moisture on glass, comprising aluminium stearate, naphtha, rosin oil, paraffin oil, and rotten stone in about the proportions mentioned.

2. A composition of matter for preventing accumulation of moisture on glass, comprising a mixture of aluminium stearate, naphtha, rosin oil, paraffin oil, and rotten stone.

3. A composition of matter for preventing accumulation of moisture on smooth surfaces, comprising aluminium stearate, a condensation preventer, an attrition agent, and a solvent.

4. A composition of matter for preventing accumulation of moisture on smooth surfaces comprising aluminium stearate mixed with a condensation preventer and an attrition agent.

5. A composition of matter for preventing accumulation of moisture on smooth surfaces, comprising aluminium stearate, and an attrition agent.

6. A composition of matter for preventing accumulation of moisture on smooth surfaces, including aluminium stearate and rotten stone.

7. A composition of matter for preventing accumulation of moisture on smooth surfaces, comprising rotten stone, a condensation preventer, and a binder for the rotten stone and a softener for the condensation preventer.

8. A composition of matter for preventing the accumulation of moisture on smooth surfaces, comprising an attrition agent, a condensation preventer, a softener for the latter, and a solvent.

9. A composition of matter for preventing accumulation of moisture on smooth surfaces, comprising an attrition agent, a condensation preventer, a binder and softener for said attrition agent and condensation preventer, and a solvent, such composition being adapted to be absorbed by a fabric and remain therein when the solvent evaporates.

10. A composition of matter for preventing accumulation of moisture on smooth surfaces, comprising an attrition agent, a condensation preventer, and a binder and softener for such ingredients, said composition being adapted to be retained in the interstices of a fabric.

In testimony whereof I hereunto affix my signature.

RALPH W. DARNER.

Copies of this patent may be obtained for five cents each, by addressing the "Commissioner of Patents, Washington, D. C."